(12) United States Patent
Russell

(10) Patent No.: US 11,111,017 B2
(45) Date of Patent: Sep. 7, 2021

(54) UNMANNED AERIAL VEHICLES

(71) Applicant: Iain Matthew Russell, London (GB)

(72) Inventor: Iain Matthew Russell, London (GB)

( * ) Notice: Subject to any disclaimer, the term of this patent is extended or adjusted under 35 U.S.C. 154(b) by 309 days.

(21) Appl. No.: 16/210,413

(22) Filed: Dec. 5, 2018

(65) Prior Publication Data

US 2019/0185159 A1 Jun. 20, 2019

(30) Foreign Application Priority Data

Dec. 14, 2017 (GB) ..................................... 1720915
Feb. 8, 2018 (GB) ..................................... 1802098

(51) Int. Cl.
*B64C 39/02* (2006.01)

(52) U.S. Cl.
CPC ...... *B64C 39/024* (2013.01); *B64C 2201/042* (2013.01); *B64C 2201/066* (2013.01); *B64C 2201/08* (2013.01); *B64C 2201/141* (2013.01); *B64C 2201/18* (2013.01); *B64C 2201/205* (2013.01); *B64C 2201/206* (2013.01); *B64C 2201/208* (2013.01)

(58) Field of Classification Search
CPC ............ B64C 39/024; B64C 2201/042; B64C 2201/066; B64C 2201/08; B64C 2201/141; B64C 2201/18; B64C 2201/205; B64C 2201/206; B64C 2201/208
See application file for complete search history.

(56) References Cited

U.S. PATENT DOCUMENTS

| 9,056,676 | B1 * | 6/2015 | Wang ................. G01C 21/3697 |
| 9,778,653 | B1 * | 10/2017 | McClintock ............ B60L 53/65 |
| 2011/0068224 | A1 | 3/2011 | Kang | |
| 2015/0069968 | A1 | 3/2015 | Pounds | |
| 2016/0196756 | A1 * | 7/2016 | Prakash ................. G08G 5/025 701/3 |
| 2016/0214717 | A1 | 7/2016 | De Silva | |
| 2017/0160735 | A1 | 6/2017 | Mikan | |
| 2020/0031471 | A1 * | 1/2020 | Datta Gupta .......... B60K 15/00 |
| 2020/0108713 | A1 * | 4/2020 | Bennie ................... B60K 15/00 |

FOREIGN PATENT DOCUMENTS

| CN | 202271897 U | 6/2012 |
| KR | 20180096258 A | 8/2018 |
| WO | 2017185378 A1 | 11/2017 |

* cited by examiner

*Primary Examiner* — Rodney A Bonnette

(57) ABSTRACT

Various measures (for example methods, UAVs, controllers and computer programs) are provided in relation to controlling a UAV. The UAV is caused to provide energy to and receive energy from a given vehicle. The received energy is used to provide power to at least one component of the UAV.

18 Claims, 2 Drawing Sheets

UNMANNED AERIAL VEHICLES

CROSS-REFERENCE TO RELATED APPLICATIONS

This application claims priority under 35 U.S.C. § 119(a) to UK Patent Application Nos. GB1720915.6, filed on Dec. 14, 2017, and GB1802098.2, filed on Feb. 8, 2018. The entire content of each of these patent applications is hereby incorporated by reference.

FIELD

This disclosure relates to unmanned aerial vehicles (UAVs). In particular, this disclosure relates to methods of controlling UAVs, UAVs, controllers and computer programs.

BACKGROUND

A UAV, which may be known as a 'drone' or an 'unmanned aircraft system (UAS)', is an aircraft that does not have a human pilot aboard. UAVs can be used for various purposes. For example, UAVs may be used for recreational and/or academic and/or commercial purposes. UAVs are generally, but not exclusively, battery-powered. UAVs typically have a limited operating range, which restricts scenarios in which UAVs can be used. The operating range may be limited by the capacity of the battery, for example.

With developments in battery technology, the operating range of UAVs may be increased. However, even with such developments, the increases in operating ranges may be minimal. Furthermore, replacing an existing battery of a UAV with a more effective battery may not be viable in some cases, for example where a battery in an existing UAV cannot physically be removed and replaced.

SUMMARY

According to first example embodiments, there is provided a method of controlling an unmanned aerial vehicle. UAV, the method comprising:
causing the UAV to fly to a vehicle;
causing the UAV to physically engage with the vehicle such that the UAV is transported by the vehicle when the vehicle moves; and
causing the UAV to disengage from, and fly away from, the vehicle,
wherein the method is performed while the UAV is operating in an autonomous mode by a controller comprised in the UAV.

According to second example embodiments, there is provided a method performed by an unmanned aerial vehicle, UAV, operating in an autonomous mode and having an operating range, the method comprising piggybacking on another vehicle in response to determining that the other vehicle has an operating range that is at least partly outside the operating range of the UAV and that the operating range of the other vehicle includes a target flight destination of the UAV, the target flight destination of the UAV being outside the operating range of the UAV.

According to third example embodiments, there is provided a method of controlling an unmanned aerial vehicle, UAV, the method comprising providing energy to a vehicle and/or receiving energy from the vehicle while the UAV is physically engaged with and being transported by the vehicle between a predetermined UAV-vehicle engaging location and a predetermined UAV-vehicle disengaging location.

According to fourth example embodiments, there is provided a method of controlling an unmanned aerial vehicle, UAV, the method comprising:
causing the UAV to provide energy to and receive energy from a given vehicle; and
using the received energy to power at least one component of the UAV.

According to fifth example embodiments, there is provided a method comprising one or both of (i) a vehicle and (ii) an unmanned aerial vehicle, UAV, receiving energy from and providing energy to the other of the vehicle and the UAV, whereby to provide power to at least one component of the vehicle and to at least one component of the UAV.

According to fifth example embodiments, there is provided a method of controlling an unmanned aerial vehicle, UAV, the method comprising:
causing the UAV to fly to a vehicle;
causing the UAV to physically engage with the vehicle such that the UAV is transported by the vehicle when the vehicle moves; and
causing the UAV to disengage from, and fly away from, the vehicle,
wherein the method is performed while the UAV is operating in an autonomous mode by a controller comprised in the UAV,
wherein the UAV provides energy to the vehicle while the UAV is physically engaged with the vehicle, and
wherein the UAV receives energy from the vehicle, while the UAV is physically engaged with the vehicle, to charge a battery of the UAV.

According to sixth example embodiments, there is provided an unmanned aerial vehicle, UAV, configured to perform a method according to any of the first, second, third, fourth or fifth example embodiments.

According to seventh example embodiments, there is provided an unmanned aerial vehicle, UAV, comprising input componentry, one or more controllers, a battery and output componentry, the one or more controllers being communicatively coupled to the input componentry and the output componentry, the one or more controllers being configured to perform a method according to any of the first, second, third, fourth or fifth example embodiments.

According to eighth example embodiments, there is provided a controller configured to perform a method according to any of the first, second, third, fourth or fifth example embodiments.

According to ninth example embodiments, there is provided a computer program arranged, when executed, to perform a method according to any of the first, second, third, fourth or fifth example embodiments.

BRIEF DESCRIPTION OF FIGURES

Various features will now be described, by way of example only, with reference to the accompanying drawings in which.

DETAILED DESCRIPTION

In some examples described herein, a UAV can, in effect, piggyback on a vehicle to be transported from one location to another, for example when the UAV operates autonomously. This can increase the effective operating range of the UAV. The effective operating range is the normal operating range of the UAV itself augmented by the operating range of the vehicle.

Figure 1:
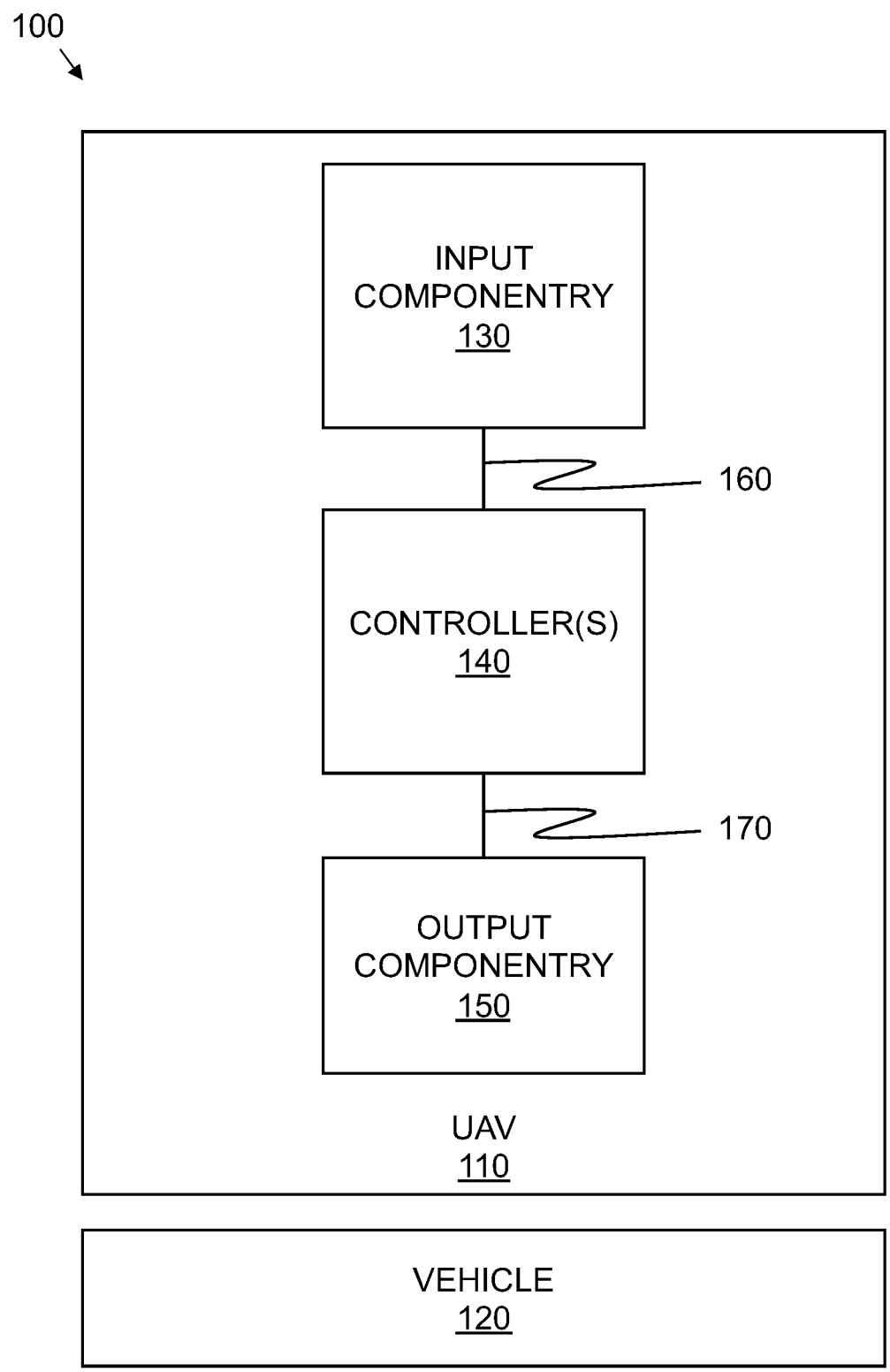
FIG. 1 shows a block diagram of an example system in accordance with embodiments.

Referring to FIG. 1, there is shown a block diagram representing an example of a system 100. The system 100 can be used for recreational purposes. For example, a hobbyist may use the system 100 to take aerial photographs of a remote location, activity etc. of personal interest to them. The system 100 can be used for academic purposes. For example, an academic institution may use the system 100 to take aerial photographs of a remote geographic location of academic interest. The system 100 can be used for commercial purposes. For example, a commercial enterprise may use the system 100 to deliver an object, provide a commercial service etc. to a remote customer.

The system 100 comprises a UAV 110 and a vehicle 120. A UAV 110 is an example of a vehicle 120. As such, the system 100 comprises two vehicles; the UAV 110 and the further vehicle 120. The system 100 can comprise more than one UAV and/or more than one additional vehicle. The system 100 can comprise one, or more than one, type of vehicle.

The vehicle 120 may be a motor vehicle. Examples of motor vehicles include, but are not limited to, motorcycles, cars, trucks and buses. Motor vehicles are ubiquitous in many countries and may therefore readily be available for implementation of the measures described herein. Motor vehicles generally travel along roads having well-defined routes that can be determined before the motor vehicle undertakes a journey. Motor vehicles can, however, often encounter traffic congestion, for example on busy roads, in heavily populated areas etc.

The vehicle 120 may be an aircraft. Examples of aircraft include, but are not limited to, aeroplanes, helicopters and UAVs. Aircraft do not generally experience the same level of traffic congestion as road vehicles. Some aircraft have significantly longer ranges than road vehicles. The consequences of failure of an aircraft, while in flight, can be more significant than failure of a road vehicle.

The vehicle 120 may be a bicycle. Bicycles are generally powered by a human rider. For this and other reasons, the operating costs of a bicycle can be lower than a road vehicle or aircraft. Further, the journey time for a bicycle can be lower than other vehicles in large cities. A bicycle may be at least partly electrically powered.

The vehicle 120 may be a railed vehicle. Examples of railed vehicles include, but are not limited to, trains and trams. Railed vehicles generally operate in accordance with a timetable, which can be determined before the railed vehicle undertakes a journey. Railed vehicles generally travel along a predetermined rail route. Some railed vehicles travel directly from a starting station to a destination station. Some railed vehicles have one or more predetermined stops between a starting station and a destination station.

The vehicle 120 may be a watercraft. Examples of watercraft include, but are not limited to, ships and boats. Watercraft may be able to access locations inaccessible by other vehicles, such as road and railed vehicles.

The vehicle 120 may, however, be of a different type.

Returning now to the UAV 110, the UAV 110 comprises input componentry 130, a controller 140 and output componentry 150.

The controller 140 is communicatively coupled to the input componentry 130 via a coupling 160. The controller 140 is communicatively coupled to the output componentry 140 via a coupling 170. The UAV 110 may comprise more than one controller 140.

The controller 140 may be embodied in hardware and/or software. The controller 140 is operable to control one or more components, modules, functions and/or operations of the UAV 110. The controller 140 may, amongst other things, allow the UAV 110 to operate in an autonomous mode. The controller may be arranged to execute computer-readable instructions comprised in a computer program and, thus, to cause the measures described herein to be performed.

The UAV 110 can comprise one or more different/additional components to those depicted in FIG. 1. For example, the UAV 110 may comprise memory. The memory may store a computer program comprising computer-readable instructions, which can be executed by the controller 140.

The input componentry 130 of the UAV 110 comprises one or more input components. An input component may be provided by hardware and/or software.

The input componentry 130 may comprise a camera. A camera is an example of an input component. The camera may capture visible light and/or infrared. The camera is configured to output image data to the controller 140 and/or to another component of the UAV 110. The output image data represents a scene within the field of view of the camera.

The output image data may comprise still image data and/or video data. The input componentry 130 may comprise more than one camera.

The input componentry 130 may comprise a radio frequency (RF) receiver. An RF receiver is an example of an input component. RF corresponds to frequencies in the region of around 20 kHz to around 300 GHz. The UAV 110 may receive data via the RF receiver. The RF receiver may enable the UAV 110 to receive data in accordance with, for example, Bluetooth™, Wi-Fi™, and/or another standard or protocol.

The input componentry 130 may comprise an audio input component. An example of an audio input component is a microphone.

The output componentry 150 comprises one or more output components. An output component may be provided by hardware and/or software.

In some examples, the output componentry 150 comprises an actuator. An actuator is an example of an output component. An example of an actuator is a speed controller. The speed controller may be used control motion of the UAV 110. For example, the speed controller may be arranged to control the rotation rate of one or more rotors of the UAV 110 to cause the UAV 110 to fly in a particular manner.

The output componentry 150 may comprise an RF transmitter. An RF transmitter is an example of an output component. The UAV 110 may transmit data via the RF transmitter. The RF transmitter may enable the UAV 110 to transmit data in accordance with, for example, Bluetooth™, Wi-Fi™, and/or another standard or protocol.

In some examples, the output componentry 150 comprises a light source. The light source may be used to provide illumination around at least part of the UAV 110. The light source may provide illumination in front of, behind, to one or more sides of, above and/or below the UAV 110. The light source may comprise one or more lighting elements. An example of a lighting element is a light-emitting diode (LED). The light source of the UAV 110 may augment a light source of the vehicle 120 (for example headlight, brake light, hazard light, indicator etc), may replace a light source of the vehicle 120 and/or may be used where the vehicle 120 does not have a light source.

In some examples, the output componentry 150 comprises an audio output component. The audio output component may be used to output audio around at least part of the UAV 110. An example of an audio output component is a loudspeaker. The audio output component of the UAV 110 may augment an audio output component of the vehicle 120 (for example a horn, siren etc), may replace an audio output component of the vehicle 120 and/or may be used where the vehicle 120 does not have an audio output component.

A given component of the UAV 110 may be comprised in both the input componentry 130 and the output componentry 150. For example, the UAV 110 may comprise an RF transceiver that both receives and transmits data.

In some examples, controller 140 is operable to control the UAV 110 while the UAV 110 is operating in an autonomous mode. The controller 140 may, alternatively or additionally, be operable to control the UAV 110 under the instruction of a human operator. The UAV 110 may be operable in one autonomous mode, or more than one autonomous mode. Different autonomous modes may correspond to different levels of autonomy, for example from a human operator. In one autonomous mode, the UAV 110 may have a relatively low level of autonomy and in another autonomous mode, the UAV 110 may have a relatively high level of autonomy. The UAV 110 operating in an autonomous mode may involve the UAV 110 operating fully or only partly autonomously, but not in either case not fully under the control of a human operator. However, as indicated above, the UAV 110 may, in some examples, be operable under the control of a human operator, in addition to or as an alternative to being operable in one or more autonomous modes.

In some examples, controller 140 causes the UAV 110 to fly to the vehicle 120. The controller 140 may cause the UAV 110 to fly to the vehicle 120 in response to detecting a fly-to-vehicle trigger. Examples of fly-to-vehicle triggers will be described in more detail below.

Causing the UAV 110 to fly to the vehicle 120 may involve the controller 140 receiving data via the input componentry 130. The controller 140 may receive image data via the input componentry 130 and use the received image data to cause the UAV 110 to fly to the vehicle 120. The received image data may assist the controller 140 in navigating to the vehicle 120. The received image data may assist the controller 140 in identifying the vehicle 120, for example where the vehicle 120 is amongst other vehicles. The controller 140 may be configured to distinguish between the vehicle 120 and at least one other object represented in the received image data. Examples of other such objects include, but are not limited to, people and other vehicles. The controller 140 may receive location data via the input componentry 130 and use the received location data to cause the UAV 110 to fly to the vehicle 120. The received location data may indicate the location of the UAV 110 and/or the vehicle 120.

Causing the UAV 110 to fly to the vehicle 120 may involve the controller 140 controlling the output componentry 150. For example, the controller 140 may output control signals to an actuator to control flight of the UAV 110 towards the vehicle 120.

In some examples, the controller 140 causes the UAV 110 to physically engage with the vehicle 120 such that the UAV 110 is transported by the vehicle 120 when the vehicle 120 moves. The UAV 110 physically engaging with and being transported by the vehicle 120 is also referred to herein as the UAV 110 'piggybacking' on the vehicle 120.

In some examples, the UAV 110 does not physically engage with the vehicle 120, however, for at least part of a period of interaction with the vehicle 120. For example, the UAV 110 may hover above the vehicle 120 without making physical contact with the vehicle 120. The UAV 110 may be able to provide energy to and/or receive energy from the vehicle 120 without being physically engaged with the vehicle 120. For example, the UAV 110 may be able to provide energy to and/or receive energy from the vehicle 120 wirelessly. For example, the UAV 110 may be able to provide energy to and/or receive energy from the vehicle 120 via inductive power transfer. Where the UAV 110 does not physically engage with the vehicle 120, the UAV 110 may not be transported by the vehicle 120 when the vehicle 120 moves. However, by not physically engaging with the vehicle 120, damage to the UAV 110 and/or vehicle 120 associated with such physical interaction may be reduced or avoided.

The UAV 110 may be configured to facilitate movement of the vehicle 120 while the UAV 110 is physically engaged with the vehicle 120. For example, the controller 140 may be arranged to cause one or more rotors of the UAV 110 to rotate while the UAV 110 is physically engaged with the vehicle 120 to provide a degree of propulsion for the vehicle 120. The impact of such propulsion may depend on the nature of the UAV 110, the nature of the vehicle 120 etc.

In some examples, the UAV 110 and/or the vehicle 120 may be configured such that movement of the vehicle 120 while the UAV 110 is physically engaged with the vehicle 120 causes the UAV 110 to generate electrical energy. As such, the UAV 110 may, in effect, harvest energy as a result of movement of the vehicle 120. The electrical energy may be used to charge a battery of the UAV 110 and/or of the vehicle 120, or otherwise to provide power to one of more components of the UAV 110 and/or to one or more components of the vehicle 120. For example, the UAV 110 may be configured such that one or more rotors of the UAV 110 rotate as the vehicle 120 moves and such that the associated kinetic energy is converted into electrical energy. For example, the one or more rotors may be configured, for example in a generally vertical manner, while the UAV 110 is physically engaged with the vehicle 120 (such that, for example, generally horizontal, movement of the vehicle 120 causes the one or more rotors to rotate) and may be configured, for example in a generally horizontal manner, while the UAV 110 is in flight (such that the one or more rotors can provide lift to the UAV 110). The references to "generally" horizontal and vertical are intended to allow for deviations from strictly horizontal and vertical, for example to account for inclines in roads, take-offs and/or landings of aircraft etc.

The controller 140 may cause the UAV 110 to physically engage with the vehicle 120 in response to detecting a physically-engage trigger. Examples of physically-engage triggers will be described in more detail below. Such physical engagement may comprise the UAV 110 merely being in physical contact with the vehicle 120 (for example resting on the vehicle 120) or may comprise the UAV 110 being attached to the vehicle 120 (for example, by interlocking with the vehicle 120).

Causing the UAV 110 to physically engage with the vehicle 120 may comprise causing the UAV 110 to land on the vehicle 120. The UAV 110 may land on, and physically engage with, a roof of the vehicle 120. Causing the UAV 110 to physically engage with the vehicle 120 may comprise causing the UAV 110 to dock with the vehicle 120. The UAV 110 may physically engage with one or more predetermined parts of the vehicle 120. The one or more predetermined parts of the vehicle 120 may be reserved for the physical engagement of UAVs that are to be transported by the vehicle 120.

Causing the UAV 110 to physically engage with the vehicle 120 may comprise causing the UAV 110 to engage with an underside of the vehicle 120. This may provide a more aerodynamic engagement than if the UAV 110 landed on the roof of the vehicle 120. However, the UAV 110 may be more susceptible to damage when engaged with an underside of the vehicle 120.

Causing the UAV 110 to physically engage with the vehicle 120 may comprise causing the UAV 110 to engage with a front, back and/or side of the vehicle 120.

Causing the UAV 110 to physically engage with the vehicle 120 may comprise causing the UAV 110 to engage with an interior of the vehicle 120.

Causing the UAV 110 to physically engage with the vehicle 120 may involve the controller 140 receiving data via the input componentry 130. The controller 140 may receive image data via the input componentry 130 and use the received image data to cause the UAV 110 to physically engage with the vehicle 120. The received image data may assist the controller 140 in physically engaging with the vehicle 120.

Causing the UAV 110 to physically engage with the vehicle 120 may involve the controller 140 controlling the output componentry 150. For example, the controller 140 may output control signals to an actuator to make the UAV 110 physically engage with the vehicle 120.

The UAV 110 may physically engage with the vehicle 120 while the vehicle 120 is stationary. The UAV 110 may physically engage with the vehicle 120 while the vehicle 120 is moving. Physically engaging with a stationary vehicle may be more straightforward than physically engaging with a moving vehicle. However, there may be more opportunities for piggybacking on vehicles where the UAV 110 can physically engage with a moving vehicle. For example, the UAV 110 may be able to physically engage a vehicle at more points in a journey than if the UAV 110 were required to only physically engage with a stationary vehicle.

In some examples, the controller 140 causes the UAV 110 to disengage from, and fly away from, the vehicle 120. The controller 140 may cause the UAV 110 to disengage, and fly away from, the vehicle 120 in response to detecting a disengage-and-fly-away trigger. Examples of disengage-and-fly-away triggers will be described in more detail below.

The UAV 110 may disengage from the vehicle 120 while the vehicle 120 is stationary. The UAV 110 may disengage from the vehicle 120 while the vehicle 120 is moving. Disengaging and flying away from a stationary vehicle may be more straightforward than disengaging and flying away from a moving vehicle. However, there may be more opportunities for piggybacking on vehicles where the UAV 110 can disengage and fly away from a moving vehicle. For example, the UAV 110 may be able to disengage and fly away from a vehicle at more points in a journey than if the UAV 110 were required to wait until the vehicle were stationary.

The UAV 110 may provide energy to the vehicle 120, for example while the UAV 110 is physically engaged with the vehicle 120. Such energy may be provided wirelessly and/or via physical connection. The UAV 110 may provide energy to the vehicle 120 in exchange for being transported by the vehicle 120. Such energy may, for example, be used to charge a battery of the vehicle 120. More generally, such energy may be used to power at least one component of the vehicle 120. As such, while the received energy may be used to charge a battery of the vehicle 120, the received energy may alternatively or additionally be used to power at least one other component of the vehicle 120.

The vehicle 120 may provide energy to the UAV 110, for example while the UAV 110 is physically engaged with the vehicle 120. Such energy may be provided wirelessly and/or via physical connection. The UAV 110 may therefore be charged by the vehicle 120 while being transported by the vehicle 120. Such energy may, for example, be used to charge a battery of the UAV 110. More generally, such energy may be used to power at least one component of the UAV 110. As such, while the received energy may be used to charge a battery of the UAV 110, the received energy may alternatively or additionally be used to power at least one other component of the UAV 110.

Such provision of energy (to and/or from the UAV 110) may enable the operating range of the UAV 110 (and/or the vehicle 120) to be extended, relative to such energy not having been provided. As such, in some examples, the effect of the provision of the energy is that the operating range of the recipient increases as a result of the provision of the energy.

In some specific examples, the UAV 110 both provides energy to the vehicle 120 and receives energy from the (same) vehicle 120. As a result, at least one component of the UAV 110 and at least one component of the vehicle 120 is provided with power as a result of the energy transfer. In some examples, the UAV 110 provides energy to the vehicle 120 and then receives energy from the vehicle 120. For example, the UAV 110 may provide energy to the vehicle 120 such that the vehicle 120 can reach a refueling location; once the vehicle 120 has refueled, the vehicle 120 may provide energy to the UAV 110. In this manner, the UAV 110 can enable the vehicle 120 to reach the refueling location, may be transported to the refueling location by the vehicle 120, and then may receive energy from the vehicle in return.

In some examples, the UAV 110 receives energy from the vehicle 120 and then provides energy to the vehicle 120. For example, the UAV 110 may receive energy from the vehicle 120 to enable the UAV 110 to perform a given action (for example to fly to a particular location) and the UAV 110 may return some or all remaining energy to the vehicle 120 once the action has been performed.

Such providing and receiving of energy between the UAV 110 and the vehicle 120 may be performed multiple times. Further, such energy providing can, but does not need to, alternate between providing and receiving energy. For example, the UAV 110 may provide energy to the vehicle 120 multiple times without having received energy from the vehicle and then may receive energy from the vehicle 120.

The receiving energy from the vehicle 120 and/or the providing of energy to the vehicle 120 may occur while the UAV 110 is physically engaged with the vehicle 120. In such examples, the UAV 110 may remain physically engaged with the vehicle 120 between the receiving energy from the vehicle 120 and the providing of energy to the vehicle 120 (which, as indicated above, may occur in different orders in different examples) or may detach from the vehicle 120 between the receiving energy from the vehicle 120 and the providing of energy to the vehicle 120.

The receiving energy from the vehicle 120 and the providing of energy to the vehicle 120 may occur in relatively close proximity to each other, or at significantly different times. For example, the UAV 110 could receive energy to the vehicle 120, perform various other tasks, and then return to the vehicle 120 at a much later point in time to 'return' energy to the vehicle 120. The amount of energy provided by the UAV 110 may be, but need not be, the same as the amount of energy received by the UAV 110. For example, the UAV 110 may accept a relatively small amount of received energy in order to be able to complete a task if the UAV 110 has a low battery level, in exchange for providing a relatively large amount of energy at a later stage when the UAV 110 has a higher battery level.

As such, the UAV 110 may provide energy to the vehicle 120 and/or the UAV 110 may receive energy from the vehicle 120 while the UAV 120 is physically engaged with and is being transported by the vehicle 120 between a predetermined UAV-vehicle engaging location and a predetermined UAV-vehicle disengaging location. The predetermined UAV-vehicle engaging location is the location at which the UAV 110 physically engages with the vehicle 120. The predetermined UAV-vehicle disengaging location is the location at which the UAV 110 disengages from the vehicle 120.

The controller 140 may determine that the UAV 110 is authorised to be transported by the vehicle 120. Such determination may occur prior to the controller 140 causing the UAV 110 to physically engage with the vehicle 120. Such determination may occur prior to the controller 140 causing the UAV 110 to fly to the vehicle 120. Such determination may occur prior to the controller 140 causing the UAV 110 to disengage from, and fly away from, the vehicle 120.

Determining that the UAV 110 is authorised to be transported by the vehicle 120 may comprise the UAV 110 communicating with the vehicle 120 and/or communicating with an entity other than the vehicle 120. An example of an entity other than the vehicle 120 is an entity that authorises transportation of UAVs on behalf of the vehicle 120. Such an entity may authorise transportation of UAVs on behalf of the vehicle 120 and at least one additional vehicle associated with the entity. For example, such an entity may authorise transportation of UAVs on behalf of a fleet of vehicles including the vehicle 120.

The communicating with the vehicle 120 and/or the entity other than the vehicle 120 may comprise the UAV 110 receiving data. The UAV 110 may receive the data via the input componentry 130. The UAV 110 may receive the data from the vehicle 120 and/or the entity other than the vehicle 120.

The received data may comprise an authorisation credential.

An example of an authorisation credential is an authorisation token. The authorisation token may comprise a string of characters. The authorisation token may have a time-limited validity. The authorisation token may indicate that the UAV 110 is authorised to be transported by the vehicle 120.

The communicating with the vehicle 120 and/or the entity other than the vehicle 120 may comprise the UAV 110 transmitting data. The UAV 110 may transmit the data via the output componentry 150. The UAV 110 may transmit the data to the vehicle 120 and/or the entity other than the vehicle 120.

The transmitted data may comprise an authorisation credential.

The transmitted data may comprise a received authorisation credential and/or data derived from a received authorisation credential. A recipient of an authorisation token (and/or data derived from an authorisation token) transmitted by the UAV 110 may compare the authorisation token to a list of authorisation tokens corresponding to authorised UAVs. If there is a match in the list of authorisation tokens corresponding to authorised UAVs, the UAV 110 may be determined to be authorised to be transported by the vehicle 120. As such, the list of authorisation tokens corresponding to authorised UAVs may serve as a whitelist of authorised UAVs.

The transmitted data may comprise an identifier of the UAV 110. The identifier of the UAV 110 may comprise a registration identifier of the UAV 110. The registration identifier may be indicative of a registration of the UAV 110 with a registration authority. The registration authority may be government-based, aviation-authority based etc.

As described above, the UAV 110 may provide energy to the vehicle 120 while the UAV 110 is being transported by the vehicle 120 and/or the vehicle 120 may provide energy to the UAV 110 while the UAV 110 is being transported by the vehicle 120. Such provision of energy (to and/or from the UAV 110) may be a condition to the UAV 110 being authorised to be transported by the vehicle 120. In other words, the UAV 110 may be authorised to be transported by the vehicle 120 if the UAV 110 provides energy to the vehicle 120 and/or receives energy from the vehicle 120 while being transported by the vehicle 120.

In some examples, the UAV 110 providing energy to the vehicle 120 comprises the UAV 110 charging a battery of the vehicle 120. As such, the UAV 110 can, in effect, recharge an existing battery of the vehicle 120. In some examples, the UAV 110 providing energy to the vehicle 120 comprises the UAV 110 delivering a battery to the vehicle 120. As such, the UAV 110 can, in effect, deliver a new battery to the vehicle 120. The UAV 110 may collect an existing battery from the vehicle 120 in response to delivering a new battery to the vehicle 120. Recharging an existing battery of the vehicle 120 may be relatively efficient in terms of the UAV 110 not transporting a new battery to the vehicle 120. However, recharging an existing battery may be more time-consuming than delivering a new battery to the vehicle 120.

In some examples, the UAV 110 receiving energy from the vehicle 120 comprises the vehicle 120 charging a battery of the UAV 110. As such, the vehicle 120 can, in effect, recharge an existing battery of the UAV 110. In some examples, the UAV 110 receiving energy from the vehicle 120 comprises the UAV 110 collecting a battery from the vehicle 120. As such, the UAV 110 can, in effect, receive a new battery from the vehicle 120. The UAV 110 may deposit an existing battery with the vehicle 120 in response to collecting a new battery from the vehicle 120. Recharging an existing battery of the UAV 110 may be relatively uncomplicated in terms of the UAV 110 not configuring a new battery and/or removing an existing battery. However, recharging an existing battery may be more time-consuming than collecting a new battery from the vehicle 120.

As described above, the controller 140 may cause the UAV 110 to fly to the vehicle 120 in response to detecting a fly-to-vehicle trigger. An example of a fly-to-vehicle trigger is the UAV 110 receiving a request to fly to the vehicle 120 from an entity associated with the UAV 110. For example, an operator of the UAV 110 may request that the UAV 110 fly to the vehicle. Another example of a fly-to-vehicle trigger is the UAV 110 receiving a request to fly to the vehicle 120 from an entity associated with the vehicle 120. For example, an operator of the vehicle 120 may request that the UAV 110 fly to the vehicle. Another example of a fly-to-vehicle trigger is determining that the UAV 110 is authorised to be transported by the vehicle 120.

As described above, the controller 140 may cause the UAV 110 to physically engage with the vehicle 120 in response to detecting a physically-engage trigger. An example of a physically-engage trigger is determining that the UAV 110 is authorised to be transported by the vehicle 120.

As described above, the controller 140 may cause the UAV 110 to disengage from, and fly away from, the vehicle 120 in response to detecting a disengage-and-fly-away trigger. An example of a disengage-and-fly-away trigger is determining that the UAV 110 is at a predetermined location. The predetermined location may correspond to a target disengage location of the UAV 110. Another example of a disengage-and-fly-away trigger is determining that the UAV 110 is expiry of a predetermined time period. The predetermined time period may correspond to a maximum time period the UAV 110 is authorised to be transported by the vehicle 120. Another example of a disengage-and-fly-away trigger is determining that the UAV 110 is a kinetic event. The kinetic event may correspond to the vehicle 120 becoming stationary.

Figure 2:
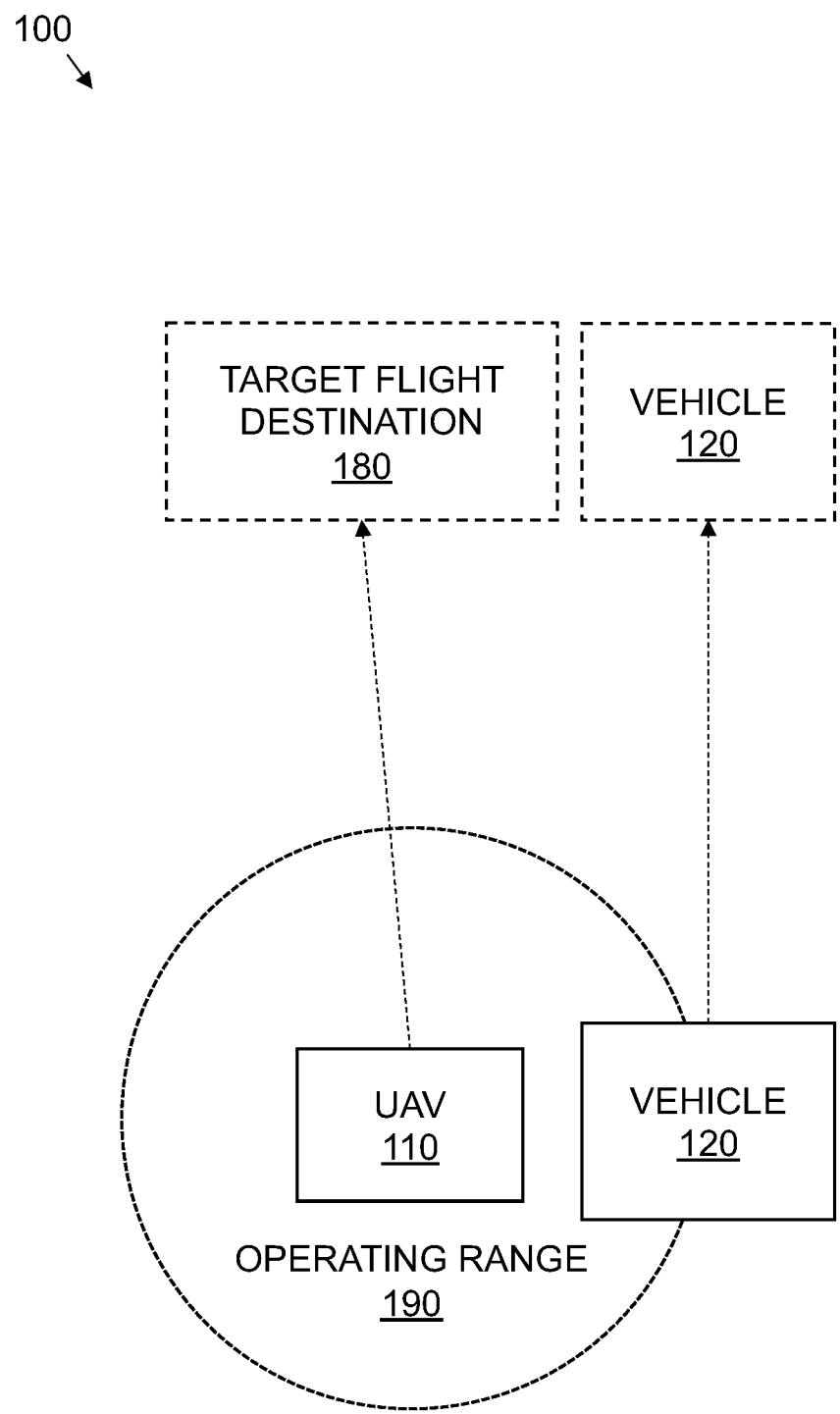
FIG. 2 shows a schematic diagram of the example system shown in FIG. 1.

Referring to FIG. 2, there is shown schematically a representation of the example system 100 described above with reference to FIG. 1.

The UAV 110 has a target flight destination 180 prior to physically engaging with the vehicle 120. The target flight destination 180 may be a home location of the UAV 110, or otherwise.

The UAV 110 has an operating range 190 prior to physically engaging with the vehicle 120. The target flight destination 180 is outside the operating range 190 of the UAV 110. As such, the UAV 110 cannot reach the target flight destination 180 by itself.

The UAV 110 may transmit route information for the UAV 110. The route information for the UAV 110 identifies the target flight destination 180. The route information for the UAV 110 may identify information in addition to or as an alternative to the target flight destination 180. The UAV 110 may transmit at least part of the route information for the UAV 110 to the vehicle 120. The UAV 110 may transmit at least part of the route information for the UAV 110 to an entity other than the vehicle 120.

The UAV 110 may receive route information for the vehicle 120. The UAV 110 may receive at least part of the route information for the vehicle 120 from the vehicle 120. The UAV 110 may receive at least part of the route information for the vehicle 120 from an entity other than the vehicle 120.

The UAV 110 may receive operating range information for the vehicle 120. The operating range information for the vehicle 120 may indicate the operating range of the vehicle 120.

As such, the UAV 110 can piggyback on the vehicle 120 in response to determining that the vehicle 120 has an operating range that is at least partly outside the operating range 190 of the UAV 110 and that the operating range of the vehicle 120 includes a target flight destination 180 of the UAV 120, where the target flight destination 180 of the UAV 110 is outside the operating range 190 of the UAV 110.

Various measures (for example methods, UAVs, controllers and computer programs) are provided in which a UAV is caused to fly to a vehicle. The UAV is caused to physically engage with the vehicle such that the UAV is transported by the vehicle when the vehicle moves. The UAV is caused to disengage from, and fly away from, the vehicle. Such measures are provided in relation to the UAV operating in an autonomous mode by a controller comprised in the UAV. As such, the operating range of the UAV may be increased compared to the UAV not piggybacking on the vehicle. Although other solutions may be available to increase an operating range of a UAV, such as increasing battery size, the measures provided herein may be applied to existing UAVs, for example following a software and/or firmware update and/or upgrade.

The controller of comprised in the UAV may determine that the UAV is authorised to be transported by the vehicle. As such, the likelihood of the UAV being able to piggyback on the vehicle is increased, compared to no authorisation being performed.

The determining that the UAV is authorised to be transported by the vehicle may occur prior to the UAV being caused to physically engage with the vehicle. By such determining occurring before the UAV physically engaging with the vehicle, the UAV can avoid damage to the vehicle and/or potential legal contraventions in relation to the vehicle if is in fact not authorised to piggyback on the vehicle.

The determining that the UAV is authorised to be transported by the vehicle may occur prior to the UAV being caused to fly to the vehicle. As such, it can be determined at a relatively early stage that the UAV can piggyback on the vehicle, for example where the UAV has expended low/minimal energy in navigating to the vehicle.

The determining that the UAV is authorised to be transported by the vehicle may comprise the UAV communicating with the vehicle and/or an entity other than the vehicle and may comprise the UAV transmitting and/or receiving data. As such the UAV can interact with another entity (the vehicle or otherwise) to increase the confidence in being allowed to piggyback on the vehicle, for example as a result of third-party validation of such.

The UAV may physically engage with a roof of the vehicle. This is likely to cause limited impact on an occupant of the vehicle, where the piggybacked UAV can be out-of-sight from the perspective of the occupant. The roof may provide a convenient landing and/or disembarking location compared, for example to an underside of the vehicle, an interior of the vehicle etc.

The UAV may be caused to fly to the vehicle in response to a fly-to-vehicle trigger and/or may be caused to physically engage with the vehicle in response to a physically-engage trigger and/or may be caused to disengage from, and fly away from, the vehicle in response to a disengage-and-fly-away trigger. Such triggers enable the UAV to operate effectively in an autonomous mode.

The UAV may provide energy to the vehicle and/or vehicle may provide energy to the UAV while the UAV is physically engaged with the vehicle. The UAV may provide energy to the vehicle as a condition or in exchange for piggybacking on the vehicle. The vehicle may provide energy to the UAV to increase the operating range of the vehicle for when the UAV flies away from the vehicle, for example compared to the operating range of the UAV prior to piggybacking.

The UAV may have a target flight destination prior to physically engaging with the vehicle. The UAV may have an operating range prior to physically engaging with the vehicle and the target flight destination may be outside the operating range of the UAV. Route information for the UAV identifying the target flight destination may be transmitted. At least part of the route information for the UAV may be transmitted to the vehicle and/or to an entity other than the vehicle. Route information for the vehicle may be received. At least part of the route information for the vehicle may be received from the vehicle and/or from an entity other than the vehicle. As such, the UAV or another entity can make a more informed decision on the effectiveness of the UAV piggybacking on the vehicle, for example if the UAV would not be able to reach the target flight destination without the piggybacking.

The UAV may physically engage with the vehicle while the vehicle is stationary. The UAV may physically engage with the vehicle while the vehicle is moving. The UAV may disengage from the vehicle while the vehicle is stationary. The UAV may disengage from the vehicle while the vehicle is moving. Physically engaging and/or disengaging while the vehicle is stationary may be less computationally complex and/or more reliable than physically engaging and/or disengaging while the vehicle is in motion. However, physically engaging and/or disengaging while the vehicle is in motion may allow for more UAV-vehicle engaging locations and/or UAV-vehicle disengaging locations than if the UAV only physically engaged and/or disengaged while the vehicle is stationary.

Various measures (for example methods, UAVs, controllers and computer programs) are provided in which a UAV operates in an autonomous mode and has an operating range. The UAV piggybacks on another vehicle in response to determining that the other vehicle has an operating range that is at least partly outside the operating range of the UAV and that the operating range of the other vehicle includes a target flight destination of the UAV. The target flight destination of the UAV is outside the operating range of the UAV. As such, the effective operating range of the UAV is increased compared to the UAV not piggybacking on the vehicle.

Various measures (for example methods, UAVs, controllers and computer programs) are provided in which a UAV provides energy to a vehicle and/or receives energy from the vehicle while the UAV is physically engaged with and being transported by the vehicle between a predetermined UAV-vehicle engaging location and a predetermined UAV-vehicle disengaging location. As such, the effective operating range of the UAV is increased compared to the UAV not piggybacking on the vehicle. Energy can be exchanged between the UAV and the vehicle during piggybacking, for example in exchange for allowing the piggybacking and/or to extend the operating range of the UAV.

Various modifications and alternatives will be apparent to one skilled in the art.

In examples described above, the UAV 110 is caused to fly to the vehicle 120. In other examples, the UAV 110 navigates to the vehicle 120 in another manner. For example, the UAV 110 could drive to the vehicle 120 if the UAV 110 has wheels or the like. Further, in addition or as an alternative to the UAV 110 being caused to fly to the vehicle 120, the vehicle 120 could be caused to navigate to the UAV 110. In such cases, the vehicle 120 could 'pick up' the UAV 110. This may be especially effective where the UAV 110 has insufficient energy to fly to the vehicle 120 based on a current location of the vehicle 120. In some examples, the UAV 110 and vehicle 120 could both navigate towards each other and/or towards a predetermined pick-up location. However, where the UAV 110 has insufficient energy to fly to the predetermined pick-up location, the vehicle 120 could be caused to navigate to the UAV 110. In some examples, the UAV 110 transmits its location. The UAV 110 may transmit its location to the vehicle 120, or otherwise. However, the vehicle 120 could be aware of the location of the UAV 110, or made aware of the location of the UAV 110, in another manner.

What is claimed is:

1. An unmanned aerial vehicle, UAV, configured to:
   provide energy to and receive energy from a given vehicle; and
   use the received energy to power at least one component of the UAV,
   wherein the UAV is configured to provide the provided energy to the given vehicle before receiving the received energy from the given vehicle.

2. The UAV of claim 1, wherein the UAV is configured to provide the provided energy to the given vehicle by causing an existing battery of the given vehicle to be charged and/or by causing a new battery for the given vehicle to be provided.

3. The UAV of claim 1, wherein the UAV is configured to receive the received energy from the given vehicle by causing an existing battery of the UAV to be charged and/or by causing a new battery for the UAV to be received.

4. The UAV of claim 1, wherein the UAV is configured to determine that the UAV is authorised to be transported by the given vehicle.

5. The UAV of claim 1, wherein the UAV is configured to provide the provided energy to the given vehicle and/or to receive the received energy from the given vehicle wirelessly.

6. The UAV of claim 1, wherein the UAV is configured to provide the provided energy to the given vehicle and/or to receive the received energy from the given vehicle while the UAV is physically engaged with the given vehicle.

7. The UAV of claim 6, wherein the UAV is configured to physically disengage from the given vehicle between the energy being provided to the given vehicle and the energy being received from the given vehicle.

8. The UAV of claim 6, wherein the UAV has a target flight destination prior to physically engaging with the given vehicle.

9. The UAV of claim 8, wherein the UAV has an operating range prior to physically engaging with the given vehicle and wherein the target flight destination is outside the operating range of the UAV.

10. The UAV of claim 8, wherein the UAV is configured to transmit route information for the UAV, the route information for the UAV identifying the target flight destination.

11. The UAV of claim 10, wherein the UAV is configured to transmit at least part of the route information for the UAV to the given vehicle and/or to an entity other than the given vehicle.

12. The UAV of claim 6, wherein the UAV is configured to physically engage with and/or disengage from the given vehicle while the given vehicle is stationary.

13. The UAV of claim 6, wherein the UAV is configured to physically engage with and/or disengage from the given vehicle while the given vehicle is moving.

14. The UAV of claim 1, wherein the UAV is configured to receive route information for the given vehicle.

15. The UAV of claim 14, wherein the UAV is configured to receive at least part of the route information for the given vehicle from the given vehicle and/or from an entity other than the given vehicle.

16. The UAV of claim 1, wherein UAV is configured to perform, while the UAV is operating in an autonomous mode, (i) said providing energy to and receiving energy from the given vehicle and (ii) said using the received energy to power at least one component of the UAV.

17. An unmanned aerial vehicle, UAV, configured to:
   provide energy to and receive energy from a given vehicle; and use the received energy to power at least one component of the UAV, wherein the UAV is configured to provide the provided energy to the given vehicle after receiving the received energy from the given vehicle.

18. An unmanned aerial vehicle, UAV, configured to:

provide energy to and receive energy from a given vehicle; and use the received energy to power at least one component of the UAV, wherein the UAV is configured to provide the provided energy to the given vehicle and/or to receive the received energy from the given vehicle while the UAV is physically engaged with the given vehicle, and wherein the UAV is configured to physically disengage from the given vehicle between the provided energy being provided to the given vehicle and the received energy being received from the given vehicle.

* * * * *